Nov. 14, 1944.　　　R. W. WENGEL　　　2,362,601
SLIDE PROJECTOR
Filed July 19, 1941　　　2 Sheets-Sheet 1
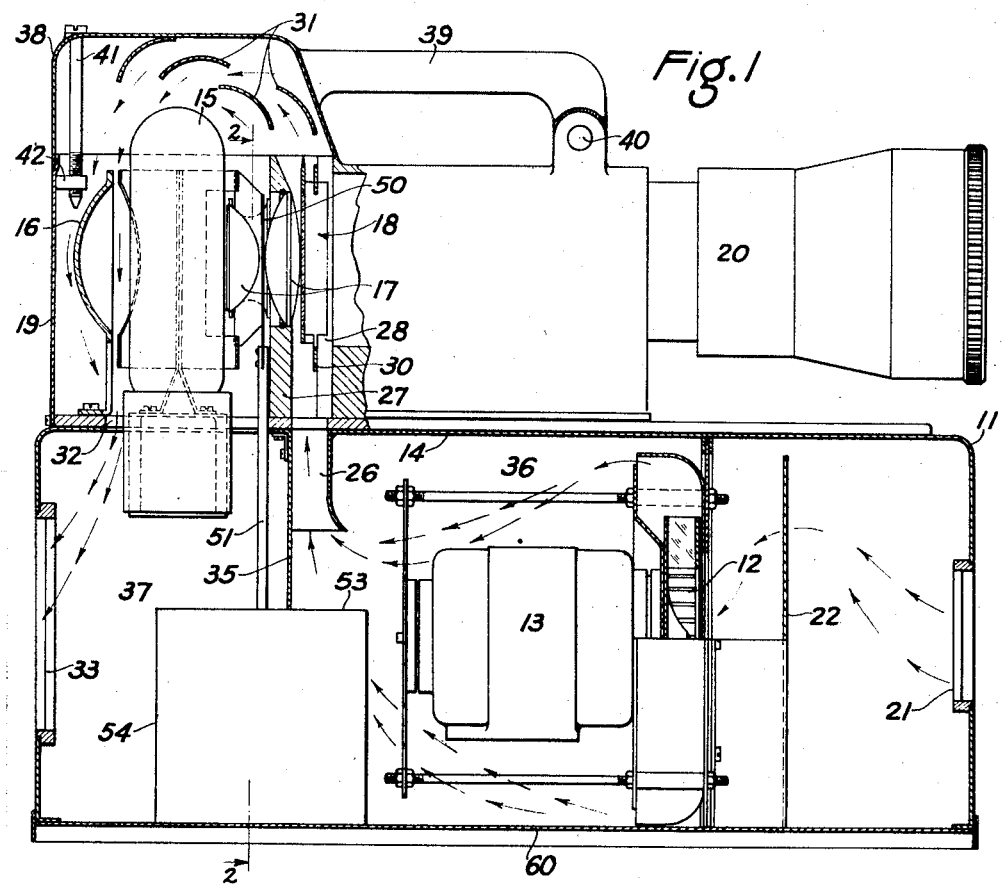
Fig.1
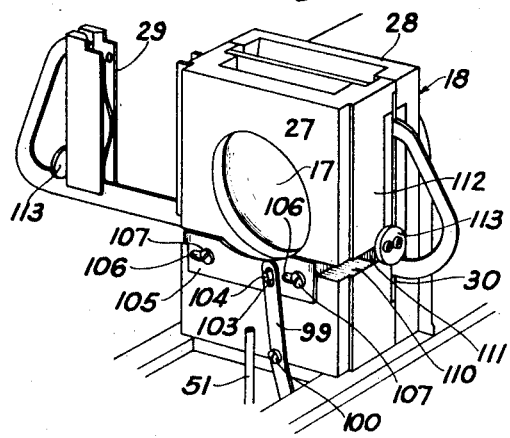
Fig.4
Fig.5
Raymond W. Wengel
INVENTOR
BY
ATTORNEYS

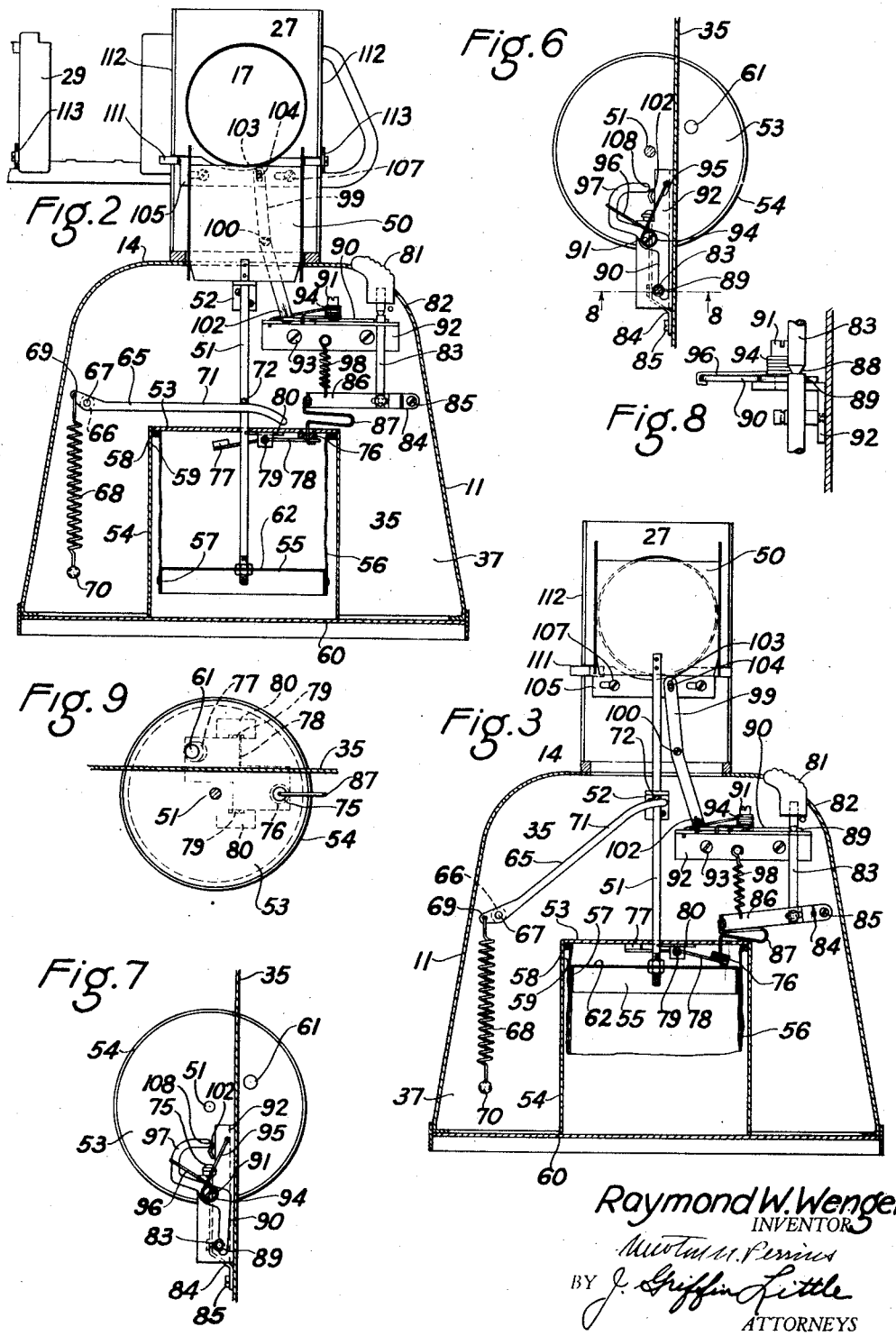

Patented Nov. 14, 1944

2,362,601

UNITED STATES PATENT OFFICE 2,362,601

SLIDE PROJECTOR

Raymond W. Wengel, Rochester, N. Y., assignor to Eastman Kodak Company, Rochester, N. Y., a corporation of New Jersey Application July 19, 1941, Serial No. 403,165

14 Claims. (Cl. 88—26)

The present invention relates to projectors of the type in which forced air-streams are utilized to retain the various parts of the projecting apparatus cool during operation, and more particularly to a light-interrupting shutter or shield for such projectors.

One object of the invention is the provision of a light shutter which will immediately and automatically move to light interrupting or obstructing position on failure of the air pressure.

Another object of the invention is the provision of an arrangement by which the shutter may be moved to light-interrupting position even without the failure of the air pressure so as to screen the slide carrier so that the movement of the image area into and out of projecting position will not be visible on the viewing screen.

A further object of the invention is the provision of an arrangement by which the movement of the slide carrier can be utilized to actuate a control mechanism for moving the shutter out of light-interrupting position after the image area has been properly positioned for projection.

Still another object of the invention is the provision of a shutter actuating mechanism, which is simple in construction, positive in its action, and highly effective in use.

To these and other ends, the invention resides in certain improvements and combinations of parts, all as will be hereinafter more fully described, the novel features being pointed out in the claims at the end of the specification.

In the drawings:

Fig. 1 is a side elevation view of a slide projector, with parts in section and parts in elevation, showing the relation thereto of a light-interrupting shutter or shield constructed in accordance with the preferred embodiment of the invention;

Fig. 2 is a vertical sectional view taken substantially on line 2—2 of Fig. 1, showing the relation of the shutter and its operating mechanism, and the relation of the parts when the shutter is in its lower or non-light-interrupting position;

Fig. 3 is a view similar to Fig. 2 but showing the relation of the parts when the shutter is in its upper or light-interrupting position;

Fig. 4 is a perspective view of the gate portion of the projector and the mounting plate for the rear condenser lens, showing the mechanism for controlling the pressure valve from the slide carrier;

Fig. 5 is a perspective view of the slidable valve-actuating bar detached from the gate member;

Fig. 6 is a plan view of the top of the air pressure or fluid chamber showing the holding mechanism for the valve actuating member in its released position.

Fig. 7 is a view similar to Fig. 6, but with the parts in position to hold the valve actuating member;

Fig. 8 is a vertical sectional view taken substantially on line 8—8 of Fig. 6, showing the relation of the valve actuating member and the holding means therefor; and Fig. 9 is a plan view of the fluid pressure or air chamber showing the relation of the valve mechanism thereto.

Similar reference numerals throughout the various views indicate the same parts.

In the preferred embodiment of the invention, the projector is formed to provide a lower fan housing 11 in which a cooling fan 12 and a drive motor 13 therefor are positioned, as will be later more fully described. On the top wall 14 of the housing 11 is mounted a projection lamp 15, a reflector 16, condenser lenses 17, and a gate, broadly designated by the numeral 18, all of which are enclosed in a casing 19, the front of which carries a lens tube 20 in which the various projecting lenses, not shown, are mounted. The lamp, condenser lenses, reflector, and gate, are all cooled by streams of cooling air supplied by the blower or fan 12 mounted in the housing 11 and driven by the motor 13. The motor and fan may be suitably mounted in the housing 11 in any desired manner. The air supply is drawn through the intake guide 21 in the housing 11 and around the baffle 22 to the blower 12. The baffle 22 and the inner surfaces of the housing 11 are preferably covered with a suitable sound-absorbing material to dissipate the sound energy in the air housing 11, and to reduce the transmission of sound through and along the material of the housing.

The air passes from the housing 11 through a vertical conduit 26 to the film gate 18. The latter comprises, broadly, a pair of spaced members 27 and 28 between which the slide carrier 29 is arranged for sliding movement. The latter is supported on a lower guide rail 30 which serves to split the incoming air stream into two separate streams which flow in stream-lined relation over the opposite sides of the image area or slide position in the slide carrier 29. As the specific structure of the gate does not constitute a part of the present invention, a further description thereof is not deemed essential.

The air stream, after leaving the gate 18, passes over a plurality of curved reflecting plates or vanes 31 which direct the air downwardly over the lamp 15, reflector 16, and the rear condenser lens 17. The air then passes through an opening 32 into the fan housing 11 and is discharged through the outlet 33. A plate 35 extends across the housing 11 and serves to divide the latter into what may be termed a pressure compartment 36 and a discharge compartment 37. As the latter is opened to the atmosphere, by reason of the outlet 33, it is substantially an atmospheric pressure, the purpose of which will be later described.

The vanes 31 are mounted in a cover or closure member 38 carried by a handle 39 pivoted at 40 to the casing 19. By means of this arrangement, the cover 38 may be raised to permit access to the lamp, condenser lenses and the gate, all of which is apparent from Fig. 1. A screw 41 extends through the cover 38 and engages in a threaded hole formed in a bracket or ear 42 on the casing 19 to retain the cover 38 in closed position.

While the above-described projector construction constitutes a preferred arrangement, this is by way of illustration only as it is contemplated that any standard or suitable construction may be used in connection with the light-interrupting shutter of the present invention to be presently described.

In projectors using lamps of high wattage, considerable heat is dissipated by the lamps. This heat may tend to injure the image area which is held in the path of the projecting light rays of the lamp 15 by the slide carrier 29, as is well known. For this reason, streams of cooling air are continually passed over the opposite faces of the positioned image area, as above described, to cool the latter so as to prevent any possible damage thereto. If, for any reason, these cooling air streams should be interrupted, even for a short interval of time, irreparable damage to the image area may result, all of which is well known to those in the art. For this reason, the present invention provides a light-interrupting shield or shutter 50 which is normally held out of the path of the projecting light so long as the cooling air streams are maintained, but stoppage of these streams immediately and automatically brings mechanism into play to move the shutter into position between the projecting light and the sensitized area to protect the latter from the destructive heat rays of the light.

This shutter 50, in the present embodiment, consists of a thin plate of bright aluminum arranged to be positioned between the condenser lenses 17, as clearly shown in Fig. 1, and is proportioned to practically cut off all the projecting light rays of the lamp 15 before they reach the sensitized image area or slide positioned in the gate 18 by the slide carrier 29. By moving the shutter to such a position, upon failure of the cooling air streams, the destructive light rays are prevented from reaching the image area and the latter is thereby protectd against damage, as will be readily apparent. This shutter plate is attached to the upper end of a vertical rod 51 which is guided in a suitable bearing bracket 52 carried by the division plate 35, as shown in Figs. 2 and 3. The rod extends downwardly through the top 53 of a fluid pressure chamber 54 and has secured to the lower end thereof a cup-shaped disk 55. The top 53 thus cooperates with the bearing 52 to properly guide the rod 51 during this vertical movement to be later described. The disk 55 may be made to fit tightly within the chamber 54 to provide a cylinder and piston arrangement. It is preferred, however, to connect the disk to the walls of the chamber 54 by a sheet of suitable flexible material 56. One end of this sheet is suitably connected to the outer surface 57 of the disk, while the other end is clamped by a ring 58 to the inner surface 59 of the chamber 54 adjacent the top 53, as clearly shown in Figs. 2 and 3.

The fluid pressure chamber 54 rests on the bottom 60 of the housing 11, and extends through the division plate 35 so as to be positioned partly in both compartments 36 and 37, as clearly shown in Fig. 1, and for a purpose to be later described. The top 53 of the chamber 54 is provided with an opening 61 which connects the interior of the chamber 54 with the high pressure compartment 36, as is apparent from an inspection of Fig. 1. It is now apparent, that so long as air or fluid pressure is maintained in the compartment 36, this pressure will also act, through the opening 61, onto the top surface 62 of the disk 55 to move the latter downwardly to the position shown in Fig. 2. This downward movement of the disk 55 will, through the rod 51, also move the shutter 50 downwardly to withdraw the latter from between the condenser lenses 17 and out of the path of the projection light so as to permit the latter to pass through and project the image area held in projecting position in the slide carrier 29. Thus so long as the fluid pressure is maintained in the compartment 36, and hence in the chamber 54, the shutter will be held out of light-interrupting or obstructing position, as is apparent.

However, if the motor should stop or, if for any other reason, the air pressure should be interrupted, the image area would not be protected by the cooling air streams and would be destroyed or seriously damaged by the heat rays of the lamp 15, as will be readily appreciated by those in the art. In such an event, the shutter 50 could then be moved upwardly into position between the condenser lenses 17 to interrupt the light falling on the image areas to effectually protect the latter. The shutter could be manually moved to its protective position, as shown in Fig. 2, but such an arrangement is not satisfactory for obvious reasons. The present invention, therefore, provides an arrangement by which the shutter is immediately, positively and automatically moved into its light-obstructing position, as shown in Fig. 3, upon failure or stoppage of the protective air-pressure streams.

To this end, an arm 65 is pivoted, adjacent one end, at 66 on a stud 67 carried by the division plate 35. A spring 68 has one end secured to the short end 69 of the arm 65 while the other end of the spring is anchored to a pin or stud 70 also carried by the division plate 35. The long end 71 of the arm 65 extends into engagement with a pin 72 carried by the rod 51. The spring 68 thus tends to rock the arm 65 in a counter-clockwise direction, as viewed in Figs. 2 and 3, to lift the rod 51 and hence the shutter 50 from its inoperative position shown in Fig. 2 to its light-interrupting position shown in Fig. 3 upon failure of the air pressure in the fluid chamber 54. By means of this arrangement, the protective shutter 50 is held, by means of the air pressure in the chamber 54, out of light-interrupting position so long as the cooling air streams are passing over the image area. However, upon failure or stoppage of the air pressure, the spring actuating arm 65 immediately and automatically comes into operation to move the shutter 50 to light-interrupting position to effectively protect the sensitized image area.

In normal operation, however, the air pressure is maintained, and the shutter 50 is retained in its inoperative position, as shown in Fig. 2. After each image area has been projected for the desired length of time, the slide carrier 29 is slid transversely of the projector to move the image area out of projecting position and to simultaneously move another image area into said position, as is common practice and well known in the art. The image areas are thus successively moved into and out of the path of the light rays of the projection lamp 15. In most projectors, the projection light is maintained during the changing of the slides so that such changing is visible on the viewing screen, and is objectionable for obvious reasons. In order to overcome this undesirable feature, some projectors are provided with dissolving shutters or similar devices which serve to cut off the projection light during the slide changing operation so that such changing is not visible to the spectators. The present invention, however, provides a structural arrangement by which the shutter 50 may be used also to cut off or interrupt the projection light when the slides are being changed; and, upon the completion of the change, again moved to its inoperative position, so that the projection light may then project the new image area which has been moved into projection position.

As pointed out above, in normal operation the air pressure continually acts on the surface 62 of the disk 55, and retains the parts in the position shown in Fig. 2. Therefore, in order to move the shutter 50 upwardly to its light-interrupting position, as shown in Fig. 3, it is necessary to relieve the pressure in the chamber 54 so that the spring actuating arm 65 may become effective to move the shutter upwardly, in the manner pointed out above. To secure this result, the top 53 of the fluid pressure chamber 54 is provided with a second aperture or opening 75 which communicates with the discharge compartment 37. It is now apparent that when the aperture 75 is closed and the aperture 61 is opened, the air pressure will be maintained in the chamber 54 and the shutter 50 will be held in its inoperative position, as shown in Fig. 2. However, when the aperture 75 is opened, the chamber 54 is then in communication with the discharge chamber 37 which is substantially at atmospheric pressure, or at least at a pressure considerably less than that in the chamber 36. The result is that the pressure in the chamber 54 is bled or reduced to a point sufficient to permit the arm 65 to move the shutter to the position shown in Fig. 3. Thus by merely opening and closing the aperture 75, the pressure in the chamber 54 may be controlled to maintain the shutter in its inoperative position, as shown in Fig. 2, or to move the shutter to its light obstructing position shown in Fig. 3.

The present invention, however, provides a structure by which the aperture 75 may be opened to bleed the chamber 54 to permit the shutter 50 to be moved to its light-obstructing position prior to the movement of the slide carrier 29. After the new image area has, however, been moved into projecting position, the aperture 75 is again closed so as to restore the pressure to the chamber 54. This restored pressure then acts on the disk 55 to move the shutter 50 to its inoperative position. By means of this arrangement, the projecting light is interrupted during the slide changing operation so that such changes are not visible on the viewing screen, the advantages of which are apparent to those in the art.

The aperture 75 is opened and closed by a valve 76 positioned in the chamber 54. The aperture 61 may be left open at all times, but it is preferred also to provide a valve 77 for closing the aperture 61. The arrangement is such that when the valve 76 is in its aperture covering or closing position, as shown in Fig. 2, the valve 77 is moved away from the aperture 61 so that the chamber 54 and the disk 55 will be subjected to the air pressure of the compartment 36. However, when the valve 76 is moved away from the aperture 75, the valve 77 is simultaneously moved to cover the aperture 61, as shown in Fig. 3, so that the chamber 54 will be in communication with the discharge chamber 37, for the reasons pointed out above. In order that these valves may thus operate in unison, they are mounted on a plate 78 positioned within the chamber 54 and pivoted at 79 on brackets 80 secured to and depending from the top 53 of the chamber 54, as clearly shown in Figs. 2 and 3.

Now with the valves 76 and 77 in the position shown in Fig. 2 and with the air pressure maintained in the compartment 36, the shutter 50 will be retained in its operative position, as above described. However, upon failure of the air pressure, pressure in the compartment 36, the pressure in the chamber 54 will be reduced so that the arm 65 will then become effective to move the shutter to the position shown in Fig. 3, all as above described. The valves 76 and 77 will, however, remain in the position shown in Fig. 2. However, with the air pressure maintained, it is necessary to move the valves to the position shown in Fig. 3 to open the aperture 75 to bleed the chamber 54. The valves are thus moved by means of a push button 81 which projects through the side wall 82 of the housing 11, as shown in Figs. 2 and 3. This button is connected by a rod 83 to a lever 84 pivoted at one end at 85 to the plate 35. The free end 86 of the lever 84 is connected to the valve plate 78 by a substantially U-shaped spring 87 which provides a cushion between the plate 78 and the lever 84 to compensate for any differences in the movement there-between.

The button 81 is pressed prior to the movement of the slide carrier 29, and serves to move the valves 76 and 77 to the position shown in Fig. 3 at which time the chamber 54 is now cut off from the pressure compartment 36 and is in communication with the discharge compartment 37 to bleed or reduce the pressure in the compartment 54. The spring actuated arm 65 then serves to move the shutter 50 to its light-interrupting position shown in Fig. 3. The carrier 29 is then moved to bring the new image area or slide into projecting position, but such movement is not visible on the viewing screen. The button 81 may be manually held in the depressed position, but it is preferred to automatically hold it so as to maintain the valves in the chamber bleeding position during the slide changing operation. To this end, the rod 83 is formed with a tapered slot or groove 88, see Fig. 8, into which the end 89 of a double-arm lever 90 is adapted to enter to retain the rod 83 and the button 81 in the depressed position. The lever 90 is pivoted on a stud 91 carried by a bracket 92 secured to the plate 35 by screws 93 or other suitable fastening means. A spring 94 is wrapped around the stud 91 and has one end 95 anchored to the plate or bracket 92 and the other end 96 hooked over the other arm 97 of the lever 90 to move the end 89 into engaging relation with the notch or slot 88. Thus, when the button 81 is depressed, the arm 89 engages in the slot 88 to retain the button in depressed position and to hold the valves 76 and 77 in the position shown in Fig. 3 to bleed the chamber 54.

After the carrier 29 has been moved to bring the new image area into projecting position, the lever 90 may be rocked in a counter-clockwise direction, as viewed in Fig. 7 and to be later described, to move the end 89 out of the slot 88 to free the rod 83 and the button 81. A spring 98, having one end secured to the lever 84 and the other end anchored to the plate or bracket 92, then returns the parts to the position shown in Fig. 2 wherein the valve 76 has now been moved to close the opening 75 while the valve 77 uncovers the opening 61. The disk 55 is now in communication with the pressure compartment 36 and is moved by reason of the air pressure therein to return the shutter 50 to its inoperative position, as shown in Fig. 2.

The lever 90 may be rocked in any suitable manner. It is preferred, however, to control such rocking from the slide carrier 29 so that the lever 90 will be actuated only at the end of the slide carrier movement to thus insure that such movement will be completed before the shutter 50 is moved out of its light-interrupting position. Therefore, a lever 99 is pivoted at its mid-point at 100 on the member 27, which acts as a mount for rear condenser lens 17, and has the lower end thereof beveled, as shown at 102, Figs. 6 and 7. The upper end of the lever 99 is provided with a longitudinal slot 103 adapted to receive a pin 104 formed on a member 105 slidably positioned on the member 27 and of the shape best shown in Fig. 5. The member 105 is substantially U-shape and is provided with a pair of slots 106 adapted to receive pins or screws 107 on the member 27 to slidably arrange the member 105 thereon, as is apparent from an inspection of Fig. 4. It is now evident that if the member 105 is slid in either direction the lever 99 will be pivoted to move with lower beveled end 102 over the adjacent end 108 of the arm 97 of the lever 90 to rock the latter in a counter-clockwise direction to disengage the end 89 from the slot 88 to free the button 81 of the valve operating member, as above described.

Such movement of the member 105 is preferably controlled by the slide carrier 29 and only at the end of the movement thereof, for reasons already set forth. To this end, the member 105 has a pair of forwardly extending arms 109 which slide in a slot 110 formed in the member 27. The arms 109 terminate in aligned lugs or fingers 111, one of which is always adapted to project beyond one of the sides 112 of the member 27, and into the path of one of the lugs 113 carried by the slide carrier 29. Thus the movement of the slide carrier, in either direction, serves to bring one of the lugs 113 into engagement with one of the adjacent fingers 111, near the end of the slide carrier movement, and will then shift the member 105 slightly to pivot the lever 99 to release the rod 83 to permit the valves 76 and 77 to be returned to the position shown in Fig. 2, all as will be apparent from an inspection of Figs. 2, 3, 4, and 5.

By means of the above-described mechanism, the shutter 50 is normally held in its inoperative position shown in Fig. 2, but upon failure of the cooling air supply, is automatically and immediately moved to its side protecting position shown in Fig. 3. In normal operation, however, the shutter is stationary and remains in the position shown in Fig. 2. However, prior to the movement of the slide carrier 29, the shutter moving means is momentarily rendered operative to move the shutter from its inoperative position shown in Fig. 2 to its operative or slide screening position shown in Fig. 3. After the new slide has been properly positioned in the film gate and in the path of the projection lamp 15, the shutter moving means is again momentarily rendered operative to return the shutter to the position shown in Fig. 2 so that the lamp 15 may project the newly positioned slide or image area.

While only one embodiment of the invention has been disclosed, it is to be understood that the inventive idea may be carried out in a number of ways. This application is therefore not to be limited to the precise details described, but is intended to cover all variations and modifications thereof falling within the scope of the appended claims.

I claim:

1. In a projecting apparatus, the combination with a frame, a member movably mounted on said frame and adapted to move an image area into and out of the path of a projecting light, a shutter movable into and out of position to interrupt the projecting light on said area, of means for moving said shutter into said position, fluid pressure means for moving said shutter out of said position, control means for rendering the first moving means operative to move said shutter into said position, and valve means for said fluid pressure means connectable to and controlled and actuated directly by said member during the movement thereof for rendering said second moving means operative to move said shutter out of said position when said area is moved into said path.

2. In a projecting apparatus, the combination with a frame, a member movably mounted on said frame and adapted to move an image area into and out of the path of a projecting light, a shutter movable into and out of position to interrupt the projecting light on said area, of a spring actuated means to move said shutter into said position, fluid pressure means adapted to be actuated to move said shutter out of said position, control means for momentarily rendering said spring means operative to move said shutter into said position, and means connectable to said moving means and said member and actuated by the latter near the end of the movement thereof for momentarily rendering said fluid pressure means operative to move said shutter out of said path when said area is moved thereinto.

3. In a projecting apparatus, the combination with a frame, a member movably mounted on said frame and adapted to move an image area into and out of the path of a projecting light, a shutter movable into and out of position to interrupt the projecting light on said area, of means tending to move said shutter into said position, fluid pressure means tending to move said shutter out of said position, control means including a bleed-off valve adapted to render said last means ineffective so that said first means may become operative to move said shutter into said position, and actuating means directly connected to and operated by said member for moving said control means near the end of the movement of said member for rendering said second means effective to move said shutter out of said position when said area is moved into said path.

4. In a projecting apparatus, the combination with a frame, a member movably mounted on said frame and adapted to move an image area into and out of the path of a projecting light, a shutter movable into and out of position to interrupt the projecting light on said area, of a normally stationary means adapted to be actuated to move said shutter into and out of said position, manual control means for momentarily rendering the moving means operative to move said shutter into said position, and means independent of said control means connected to and actuated by said member when the latter is moved to bring said area into said path for initiating movement of said control means for rendering said moving means operative to move said shutter out of said position.

5. In a projecting apparatus, the combination with a frame, a member movably mounted on said frame and adapted to move an image area into and out of the path of a projecting light, a shutter movable into and out of position to interrupt the projecting light on said area, of means for moving said shutter into and out of said position, a control means movable to one position to render said moving means operative to move said shutter into said light interrupting position, means for holding said control means in said one position, and means controlled by the movement of said member for releasing said holding means to render said moving means operative to move said shutter out of said light interrupting position when said area is moved into said path.

6. In a projecting apparatus, the combination with a frame, a member movably mounted on said frame and adapted to move an image area into and out of the path of a projecting light, a shutter movable into and out of position to interrupt the projecting light on said area, of means for moving said shutter into and out of said position, a control means movable to one position to render said moving means operative to move said shutter into said light interrupting position, means for holding said control means in said one position, means controlled by the movement of said member for releasing said holding means, and means for moving said control means to another position to render said moving means operative to move said shutter out of said position substantially simultaneously with the movement of said area into said path.

7. In a projecting apparatus, the combination with a frame, a member movably mounted on said frame and adapted to move an image area into and out of the path of a projecting light, a shutter movable into and out of position to interrupt the projecting light on said area, of means for moving said shutter into and out of said position, control means movable to one position to render said moving means operative to move said shutter into said light interrupting position, means for actuating said control means, holding means for said actuating means, means adapted to release said actuating means, means on said member adapted to operate said release means substantially simultaneous with the movement of said area into said path, and means for moving said control means to another position to render said moving means operative to move said shutter out of said light interrupting position.

8. In a projecting apparatus, the combination with a frame, a carrier slidably mounted on said frame and adapted to move an image area into and out of the path of a projecting light, a shutter movable into and out of position to interrupt the projecting light, of a fluid pressure means adapted to move said shutter out of said position, control means for said fluid pressure means to render the latter ineffective, means for moving said shutter into said position, and means controlled by the movement of said carrier to position said area in said path to actuate said control means to render said fluid pressure means effective to move said shutter out of said position.

9. In a projecting apparatus, the combination with a frame, a carrier slidably mounted on said frame and adapted to move an image area into and out of the path of a projecting light, a shutter movable into and out of position to interrupt the projecting light, of a fluid pressure means adapted to move said shutter out of said position, control means for said fluid pressure means and movable to one position to render the latter ineffective, means for releasably holding said control means in said one position, means for moving said shutter into said light interrupting position, means controlled by the movement of said carrier to position said area in said path to release said holding means, and means for simultaneously moving said control means to another position to render said fluid pressure means effective to move said shutter out of said light interrupting position.

10. In a projecting apparatus, the combination with a frame, a carrier slidably mounted on said frame and adapted to move an image area into and out of the path of a projecting light, a shutter movable into and out of position to interrupt the projecting light, of a fluid pressure means adapted to move said shutter out of said position, control means for said fluid pressure means and movable to one position to render the latter ineffective, means for releasably holding said control means in said one position, means for moving said shutter into said light interrupting position, means mounted on said frame and adapted to release said holding means, means on said carrier for actuating said releasing means upon the positioning of said area in said path, and means for moving said control means to another position to render said fluid means operative to move said shutter out of said light interrupting position.

11. In a projecting apparatus, the combination with a frame, a carrier slidably mounted on said frame and adapted to move an image area into and out of the path of a projecting light, a shutter movable into and out of position to interrupt the projecting light, of a fluid pressure chamber mounted on said frame, a member movably mounted in said chamber and connected to said shutter, means adapted to supply a fluid pressure to said chamber, a pressure control valve for said chamber, means for moving said valve to open position to bleed said chamber, means operatively connected to said member to move said shutter into said light interrupting position, and means controlled by the movement of said slide for actuating said moving means to close said valve so as to supply fluid pressure to said member to move said shutter out of said light interrupting position.

12. In a projecting apparatus, the combination with a frame, a carrier slidably mounted on said frame and adapted to move an image area into and out of the path of a projecting light, a shutter movable into and out of position to interrupt the projecting light, of a fluid pressure chamber mounted on said frame, a member movably mounted in said chamber and connected to said shutter, means adapted to supply a fluid pressure to said chamber, a pressure control valve for said chamber, means for moving said valve to open position to bleed said chamber, means for releasably holding said last mentioned means to retain said valve in the open position, spring actuated means positioned exteriorly of said chamber but operatively connected to said member to move said shutter into light interrupting position when said valve is in its open position, means for releasing said valve holding means, and means on said carrier for actuating said releasing means to permit said valve to close to apply fluid pressure on said member to move said shutter out of said light interrupting position.

13. In a projecting apparatus, the combination with a frame, a carrier slidably mounted on said frame and adapted to move an image area into and out of the path of a projecting light, a shutter movable into and out of position to interrupt the projecting light, of a fluid pressure chamber mounted on said frame, a member movably mounted in said chamber and connected to said shutter, means adapted to supply a fluid pressure to said chamber, a spring actuated pressure control valve for said chamber, means for moving said valve to open position, means for releasably holding said valve in said open position, a spring actuated arm operatively connected to said shutter to move the latter into light interrupting position when said valve is open, means for releasing said holding means to permit said valve to move to closed position to apply fluid pressure to said member to move said shutter but of said light interrupting position, and means normally disconnected from said releasing means but engageable therewith upon the positioning of said area in said path.

14. In a projecting apparatus, the combination with a body portion formed with a fan housing, a slide carrier slidably mounted on said body portion and adapted to move image areas into and out of the path of a projecting light source positioned in said housing, a shutter mounted on said body portion and movable into and out of position to interrupt the projecting light, of a fluid pressure chamber positioned in said housing and adapted to be in fluid communication therewith, means for applying fluid pressure to said housing, a member positioned in said chamber and connected to said shutter, a pressure control valve carried by said chamber, a manual control member for moving said valve to an open position to bleed said chamber, a spring actuated member adapted to engage said control member to releasably retain the valve in open position, an arm pivotally mounted in said housing and operatively connected to said shutter, a spring for actuating said arm to move said shutter into said light interrupting position when said valve is open, a pivoted lever adapted to engage and move said spring-actuated member to release said holding means to free said valve, means for moving the freed valve to closed position to permit said fluid pressure applying means to apply pressure on said member to move said shutter out of said light interrupting position, and means as said carrier adapted to engage said pivoted lever to actuate the latter when the image area is moved into said path.

RAYMOND W. WENGEL.